No. 679,319. Patented July 30, 1901.
A. KOY & J. KVETON.
INSECT DESTROYER.
(Application filed Apr. 4, 1901.)
(No Model.) 2 Sheets—Sheet 1.
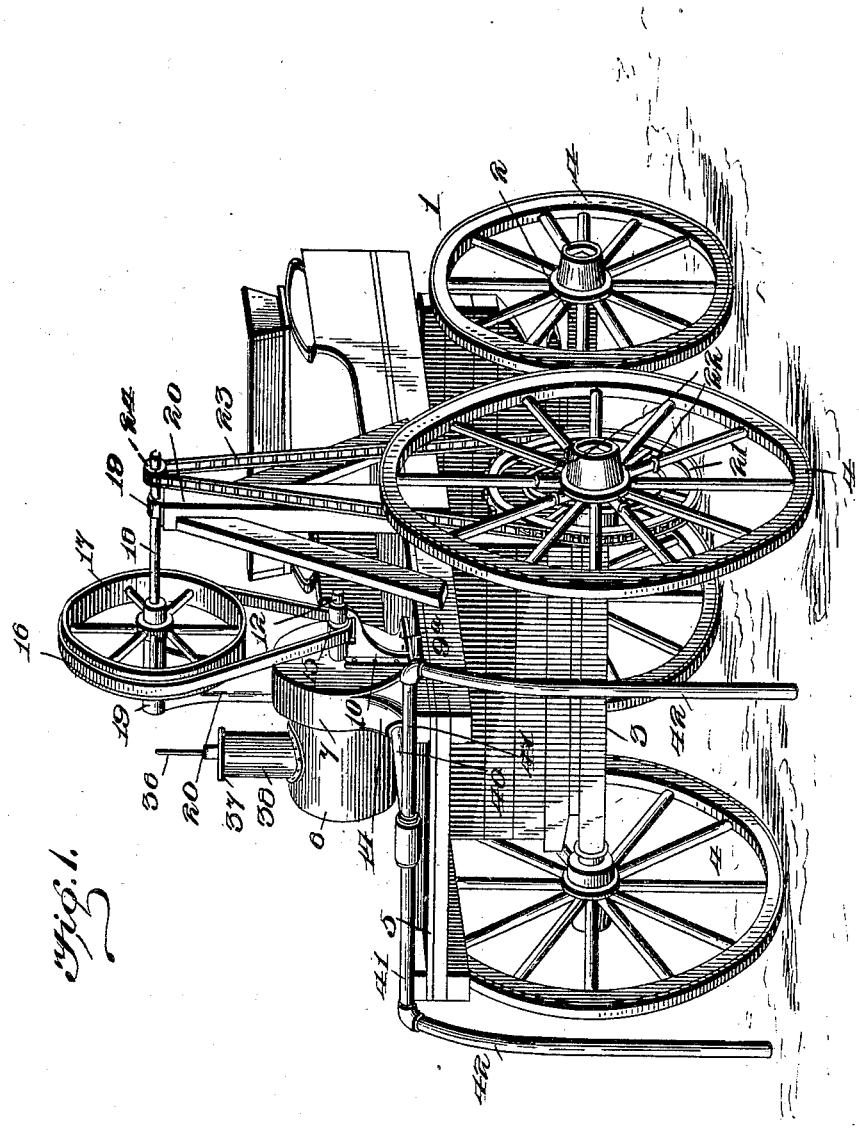
August Koy.
John Kveton,
Inventors

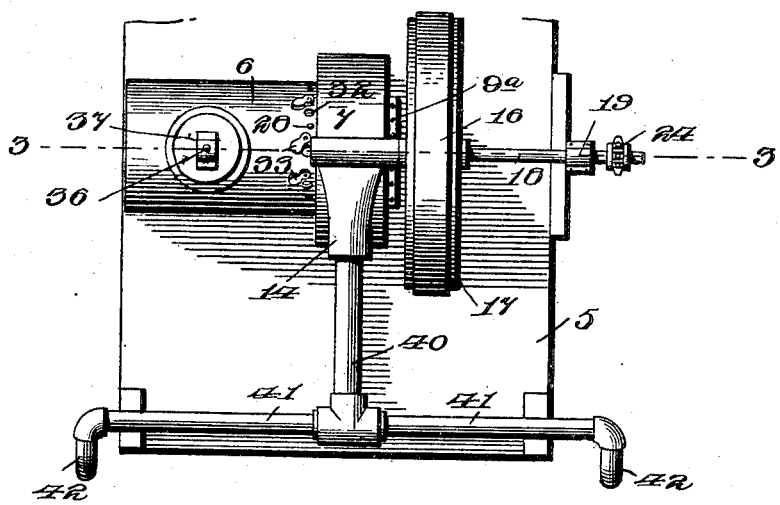

UNITED STATES PATENT OFFICE.

AUGUST KOY AND JOHN KVETON, OF SEALY, TEXAS, ASSIGNORS OF ONE-THIRD TO JAMES GALLAHER, OF BONUS, TEXAS.

INSECT-DESTROYER.

SPECIFICATION forming part of Letters Patent No. 679,319, dated July 30, 1901.

Application filed April 4, 1901. Serial No. 54,307. (No model.)

*To all whom it may concern:*

Be it known that we, AUGUST KOY and JOHN KVETON, citizens of the United States, residing at Sealy, in the county of Austin and State of Texas, have invented a new and useful Insect-Destroyer, of which the following is a specification.

This invention relates to insect-destroyers, and has special reference to that type of machines which provide for the generation of poisonous fumes and the conducting thereof to growing crops or other points where it may be necessary to reach the insects to be destroyed.

To this end the invention has in view the construction of a fumigator specially designed as an exterminator for the cotton-boll weevil, although being well adapted for the extermination of prairie-dogs, or, in fact, all classes of vermin which are destructive to crops of different kinds.

With these and many other objects in view, which will more readily appear as the nature of the invention is better understood, the same consists in the novel construction, combination, and arrangement of parts hereinafter more fully described, illustrated, and claimed.

The essential features of the invention involved in the novel arrangement and relation of parts are necessarily susceptible to some modification without departing from the spirit or scope thereof; but the preferred embodiment of the improvements is shown in the accompanying drawings, in which—

Figure 1 is a perspective view of a portable insect destroyer or exterminator constructed in accordance with the present invention. Fig. 2 is a top plan view of a portion of the machine. Fig. 3 is a sectional view on the line 3 3 of Fig. 2, showing the interior construction of the generating-drum, as well as the manner of associating the same with the blower-casing. Fig. 4 is a vertical cross-sectional view on the line 4 4 of Fig. 3.

Like numerals of reference designate corresponding parts in the several figures of the drawings.

In carrying out the present invention it is the purpose to arrange the working parts thereof upon a suitable carrier, preferably in the form of a wagon or truck, whereby the same may be readily transported from place to place, as well as conveniently drawn over a field, especially in the extermination of the cotton-boll weevil. While any special type of carrying wagon or truck is not necessary to the successful carrying out of the invention, still an ordinary flat-bed wagon, such as shown in the drawings, has been found well adapted for the purpose.

Referring particularly to the drawings, the numeral 1 designates the carrying wagon or truck, essentially comprising the usual front and rear axles 2 and 3, fitted with the ordinary supporting or ground wheels 4 and sustaining thereon an elevated bed or platform 5, upon which are mounted the main working parts of the machine.

The essential parts of the invention reside in a generator for the poisonous fumes and a blower for forcing these fumes to the point of use, said generator and blower being designated, respectively, by the reference-numerals 6 and 7. The blower 7 comprises a circular casing 8 and a rotary fan 9 working therein, said fan being of the type usually termed a "blower-fan," to provide for forcing a wind-current to any point of distribution. In the present invention the blower-casing 8 is arranged in an upright position and is provided at the lower side thereof with a rest-base 9ª, which is bolted or otherwise securely fastened on top of the elevated bed or platform 5 of the carrier wagon or truck. The casing 8 is further provided at one side thereof with an offset bearing-bracket 10, provided with alined bearings 11, in which is journaled a fan-shaft 12, to the inner end of which, within the casing 8, is rigidly fitted the rotary fan 9. The said rotary fan 9 is of an ordinary construction and essentially consists of a plurality of radially-disposed fan-blades 13, which not only create a suction for drawing the gases or fumes into the casing, but also provide for the forcible expulsion thereof under pressure through the tangential discharge-spout 14, projecting from the rim of the blower-casing 8 and preferably at the rear side thereof to permit of the convenient handling of the distributing-pipes. The said fan-shaft 12, which extends exterior to the casing 8, so as to have a firm journal-support in the bearings 11 of the bracket 10, has fitted thereon between the said bearings a belt-pulley 15, over which passes a driving-belt 16, driven from a belt-wheel 17, mounted upon a counter-shaft 18, supported in an elevated position above the bed or platform 5 in the bearings 19, provided at the upper end of a pair of supporting-standards 20, rigidly fastened and braced to the wagon bed or platform in any convenient manner and arising a suitable distance above the same to provide for the proper support of the belt-wheel 17 in vertical alinement with the pulley of the fan-shaft.

Various means may be resorted to for communicating motion to the counter-shaft 18; but the means shown in the drawings are preferred. These means involve the employment of a driving-gear 21, in the form of a skeleton gear-ring detachably bolted by means of the clip or equivalent bolts 22 to the inner side of one of the supporting or ground wheels 4 of the carrying wagon or truck. The said driving-gear 21 receives thereover an endless drive-chain 23, which also meshes with a chain wheel or pinion 24 upon one end of the counter-shaft 18. Hence when the carrier wagon or truck 1 is in motion power will be transmitted from one of the wheels thereof to the fan-shaft, thus providing for positively rotating the blower-fan, with a consequent circulation and forcing out of the fumes.

The blower-casing 8 is provided in the side thereof opposite the bracket 10, which supports the fan-shaft, with the inlet-eye 25 and from the same side thereof has projected therefrom an offset annular attaching-flange 26, which receives thereover the open end of the cylindrical generating-drum 27. This generating-drum 27 is closed at one end and open at the other, said open end being fitted, as explained, directly over the offset annular attaching-flange 26 of the blower-casing and secured thereto by means of the fastening rivets, bolts, or equivalent fastenings 28, thus providing means for firmly uniting the generating-drum to one side of the blower-casing, so that the drum and casing will be placed directly in communication with each other, while at the same time the blower-casing will provide a support for the generating-drum and obviate the necessity of individual supporting means therefor.

The generating-drum 27 is preferably of a cylindrical form and has fitted therein, contiguous to the adjacent side of the blower-casing 8, a baffle-plate 29. This baffle-plate 29 is provided therein with a plurality of circulating-ports 30 for the fumes and confines between the same and the said adjacent side of the blower-casing an air-chamber 31, with which communicates an annular series of draft-openings 32, arranged in the same circular plane and piercing the joint connection between the generating-drum and the blower-casing 8. The said draft-openings 32 are designed to supply the necessary amount of cold air to promote and maintain the combustion of the chemicals, besides providing for tempering the heat of the fumes to any desired degree. The regulation of the supply of air through the draft-openings 32 may be accomplished by any suitable means, but preferably through the medium of individual pivotal flap-valves 33. Each flap-valve 33 is associated with one of the openings 32 and is pivotally mounted upon the exterior of the generating-drum contiguous to said opening, so that the same may be readily moved upon its pivot to provide for covering or uncovering the opening, either entirely or partially, as may be desired.

Between the baffle-plate 29 and the closed end of the generating-drum 27, opposite the inlet-eye of the blower-casing, the generating-drum has arranged horizontally therein the fire-grate 34, which grate is designed to support the fuel and also a removable chemical-cup 35. The said chemical-cup 35 is of any suitable form, preferably of the open-top type, and in the present invention is designed to have suitably attached thereto the lower end of a carrying-stem 36, the upper end of which stem slidably extends through the flanged lid or cover 37, fitting in the upper end of the upright tubular entrance-dome 38, arising from the top side of the generating-drum 27. The said upright tubular entrance-dome 38 preferably consists of a short section of piping suitably fitted to the top of the generating-drum in line with a top opening therein to facilitate the introduction of fuel and the manipulation of the chemical-cup 35. Beneath the plane of the fire-grate 34 the generating-drum 27 is provided with an ash-door 39, which can be opened from time to time to provide for cleaning out the drum from ashes or other accumulations.

The fumes, which are drawn into the blower-casing and discharged through the spout 14 thereof, are forced into the delivery-pipe 40, fitted at one end in the spout 14 and carrying at its opposite end the oppositively-extending branch pipes 41, to each of which is fitted a flexible distributing tube or hose 42. The delivery-pipe 40 and its branches 41 are supported in a horizontal position on top of the truck or platform 5, while the tubes or hose 42 trail in rear of the truck and can be pointed in any direction wherever it is desired to discharge the fumes.

In the operation of the machine with the truck traveling over the ground it will be understood that the fumes generated within the drum 27 from the chemicals in the cup 35 are drawn through the circulating-ports 30 of the baffle-plate into the air-chamber 31 and thence through the inlet-eye 25 into the blower-casing, from which the said fumes are expelled through the piping described. In the use of the machine the generation of fumes may be stopped at any time by drawing the cup 35 up into the dome 38 without removing the lid or cover 37 for the dome; but when it is necessary to replenish the fuel or the chemical within the cup the said lid or cover 37 is removed therefrom, so that the chemical-cup may be drawn entirely out through the dome and the fire-grate exposed for the introduction of fresh fuel.

From the foregoing it is thought that the construction, operation, and many advantages of the herein-described insect-destroyer or fumigating-machine will be readily apparent to those familiar with the art without further description, and it will be understood that various changes in the form, proportion, and minor details of description may be resorted to without departing from the principle or sacrificing any of the advantages of this invention.

Having thus described the invention, what is claimed as new, and desired to be secured by Letters Patent, is—

1. An insect-destroyer comprising a blower having a casing provided in one side with an inlet-eye, a fume-generating drum supported at one side of the casing and provided with an interior baffle-plate spaced from the blower-casing to form an intervening air-chamber, said generating-drum being provided with a plurality of draft-openings in communication with said air-chamber, and individual pivotal flap-valves for said openings, substantially as set forth.

2. An insect-destroyer comprising a blower having a casing provided with an inlet-eye, a fume-generating drum supported at one side of the blower-casing and provided with an interior grate, and a removable chemical-cup supported on said grate, substantially as set forth.

3. An insect-destroyer comprising a blower having a casing provided with an inlet-eye, a generating-drum in communication with said inlet-eye of the casing and provided with an interior grate, and a tubular entrance-dome offset therefrom, and a separate chemical-cup adapted to be supported on said grate and removable through said dome, substantially as set forth.

4. An insect-destroyer comprising a blower, a generating-drum in communication with the blower-casing, and provided with an interior grate, and with an upright tubular entrance-dome having a removable closure at the top, and a separate chemical-receptacle adapted to be removably supported on the grate and provided with a carrying-stem extended through the closure for the dome, substantially as set forth.

5. An insect-destroyer comprising a blower, a generating-drum in communication with the blower-casing and provided at the top with an upright tubular entrance-dome, a removable lid or cover for said dome, and a separate chemical-receptacle adapted to be supported within the drum and removable through said dome, said removable chemical-receptacle being provided with a carrying-stem loosely working through the lid or cover for the dome, substantially as set forth.

In testimony that we claim the foregoing as our own we have hereto affixed our signatures in the presence of two witnesses.

AUGUST KOY.
JOHN KVETON.

Witnesses:
JAS. J. WALKER,
J. W. DAVIS.